United States Patent [19]

Gordon et al.

[11] Patent Number: 4,969,184
[45] Date of Patent: Nov. 6, 1990

[54] DATA TRANSMISSION ARRANGEMENT

[75] Inventors: Alastair T. Gordon; Michael H. Reichmann, both of Toronto, Canada

[73] Assignee: Alphanet Technology Corporation, Toronto, Canada

[21] Appl. No.: 305,113

[22] Filed: Feb. 2, 1989

[51] Int. Cl.$^5$ .................... H04M 11/00; H04N 1/32
[52] U.S. Cl. ........................... 379/100; 379/58; 379/96; 358/407; 358/435
[58] Field of Search ................ 379/93, 96–98, 379/100, 58; 358/402, 403, 407, 435

[56] References Cited

U.S. PATENT DOCUMENTS 4,178,476 12/1979 Frost ........................... 379/58

FOREIGN PATENT DOCUMENTS 0072567 6/1981 Japan ........................... 379/100

Primary Examiner—Jin F. Ng
Assistant Examiner—Wing F. Chan

[57] ABSTRACT

An improved data transmission system which uses the telephone system for transmitting information between data transmitting/receiving devices via a process intermediary is taught wherein at least some of the data transmitting/receiving devices can be actuated by a non-telephone actuation signal controlled by the process intermediary. Telephone number addresses are obtained by the process intermediately and assigned to uniquely identify non-telephone actuatable data transmitting/receiving devices. The telephone number addresses when used to transmit data to the assigned data transmitting/receiving device results in the transmitted data being received by the process intermediary and forwarded to the appropriate data transmitting/receiving device by actuating the device by means of a non-telephone actuation signal. This actuation signal causes the device to initiate a telephone communication with the process intermediary and thereby receive the transmitted data. In this way, the transmission of data to the data transmitting/receiving device identified by a telephone number address is essentially transparent to the originating data transmitting/receiving device.

6 Claims, 1 Drawing Sheet

DATA TRANSMISSION ARRANGEMENT

FIELD OF THE INVENTION

The present invention relates to data transmission systems and, in particular, to data transmission systems involving public switched telephone networks and transmission of data from an originating data transmitting/receiving device to a destined data transmitting-/receiving device via a process intermediary.

BACKGROUND OF THE INVENTION

Apparatus and various methods for transmitting data between an originating transmitting/receiving device and a destined transmitting/receiving device are taught in U.S. Pat. No. 4,713,837. According to the structure of the patent, the destined transmitting/receiving device does not require a dedicated telephone line, as a non-telephone actuation signal is transmitted by the process intermediary to the destined transmitting-/receiving device causing the destined transmitting-/receiving device to complete a telephone communication with the process intermediary for the delivery of data.

Although this system eliminates the need for a dedicated line, there remains a problem, as the transmission of data to the destined transmitting/receiving device does not occur in the manner of data transmissions between data transmitting/receiving devices having dedicated lines. It would be desirable to have a system where the data is transmitted, from the originating transmitting/receiving device to the process intermediary and subsequently to the destined transmitting-/receiving device, in a manner which appears to be identical to transmissions using dedicated lines.

SUMMARY OF THE INVENTION

According to the present invention, the process intermediary leases or otherwise obtains from the public switched telephone network a plurality of telephone number addresses which are separately allocated to particular data transmitting/receiving terminals, preferably facsimile machines. These telephone number addresses will be used as a unique address for each of the subscribing data transmitting/receiving devices, however, when this telephone number address is used, the data will be routed from the originating transmitting-/receiving device to the process intermediary. The process intermediary then, based on the telephone number address, creates a non-telephone signal to actuate or otherwise advise the destined transmitting/receiving device of the receipt of an addressed data message. Once actuated, the destined transmitting/receiving device forms a telephone communication between the process intermediary and the destined device for delivery of the data.

BRIEF DESCRIPTION OF THE PREFERRED EMBODIMENTS

Preferred embodiments of the invention are shown in the drawings, wherein:

FIG. 1 is a representation of the data transmission system.

DETAILED DESCRIPTION OF THE PREFERRED EMBODIMENTS

Figure 1:
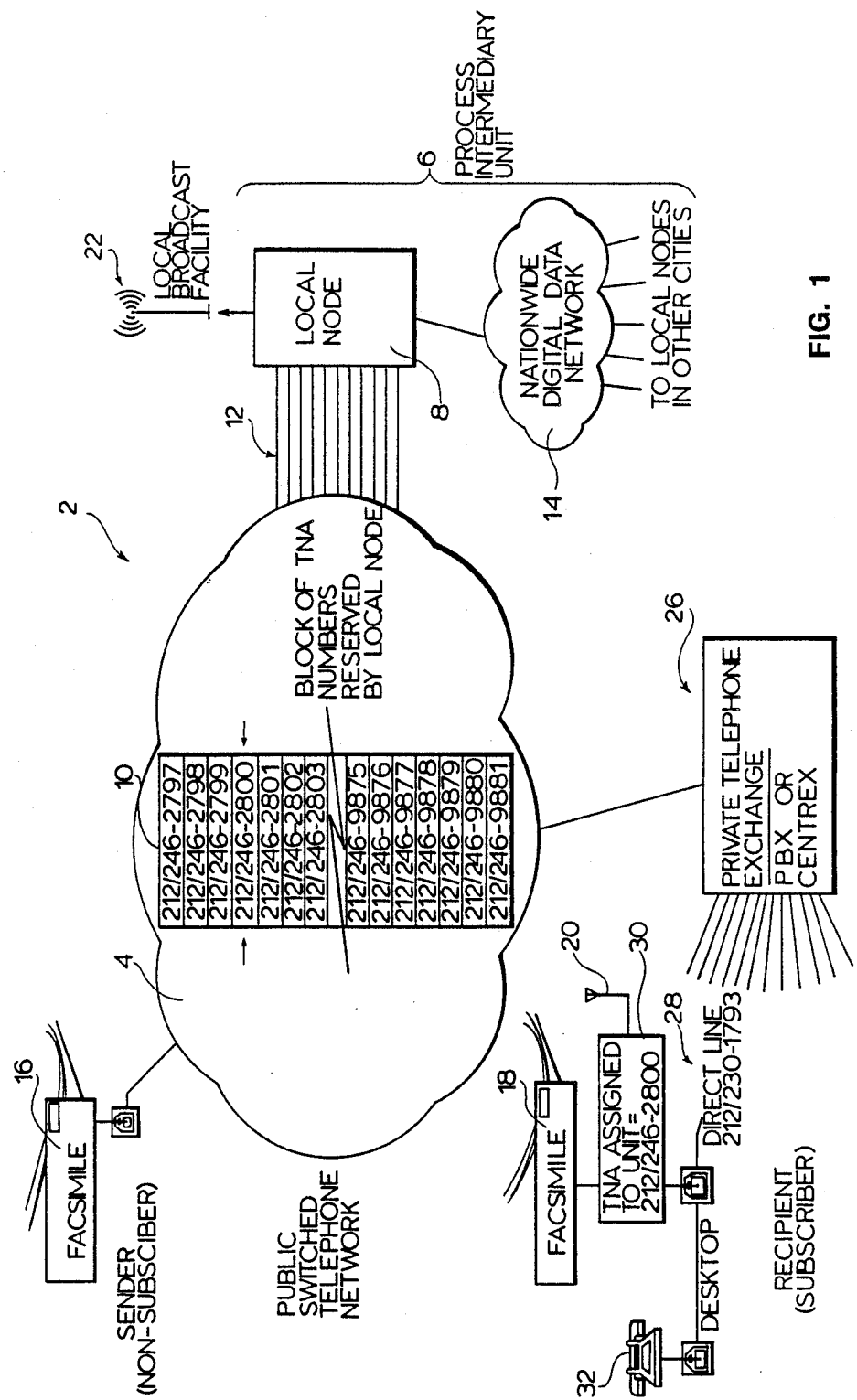

The data transmission system generally shown as 2 is obviously much more complex in that it is capable of communicating with other telephone networks. Generally, data transmission systems involve public switched telephone networks 4 from which the process intermediary 6, having local nodes 8, purchases or leases a block of telephone number addresses (TNA's) 10. These telephone number addresses are connected to the local node 8 by a number of trunk lines, generally indicated as 12. The telephone number address numbers 10 are sometimes referred to as DID numbers in the case of a private company leasing such addresses with DID standing for "direct in-dial" numbers. In any event, these numbers do not represent dedicated telephone lines, but merely telephone addresses which when used, result in a communication with the local node given that a trunk line is available.

The cost associated with reserving a TNA number is much less than the charge for a dedicated telephone line. In this way, the local node 8 can have many subscribers with each of these subscribers having a unique TNA number with a significantly less number of trunk lines for servicing of these subscribers. Thus, the cost to the local node, to assign a telephone number address to a facsimile machine or other data transmitting/receiving device, is much less than the cost for a dedicated telephone line. The local node 8 is connected to a digital data network 14 whereby the data, transmitted from one transmitting/receiving device to another, can be transmitted between local nodes 8 of the digital data network. In this way, long distance charges associated with a conventional telephone communication are replaced by a significantly reduced expense incurred for transmitting over the digital data network. Other advantages flow from the use of the digital data network, such as higher speed, improved accuracy, better quality control, etc.

The term Digital data network, as used in the present application, refers to digital data networks designed for the efficient communication of electronic messages between electronic data terminals, and this term does not include networks capable of transmitting real time continuous voice communications. Therefore, conventional public switched telephone networks are not digital data networks as used in the present application.

In order to more fully understand the data transmission system, consider that facsimile machine 16, the originating transmitting/receiving device, is about to send a data transmission to the destined transmitting-/receiving device, facsimile machine 18. The destined facsimile machine 18 has a unique TNA number assigned thereto. Facsimile machine 16 then transmits the data in the traditional manner, however, in transmitting this data it uses the TNA number which effectively connects facsimile machine 16 with the local node 8 as the call is received on one of the trunk lines 12. The telephone number address is communicated to, and noted by, the local node 8 upon receipt of the call at a trunk line 12. Preferably, an actuation signal is immediately sent out over the local broadcast facility indicated as 22 with the computer logic 30, which includes broadcast receiving capability, of the facsimile machine 18 effectively listening for an actuation signal received by the associated antenna 20 connected thereto. This arrangement is described in U.S. Pat. No. 4,713,837 incorporated herein by reference.

Upon recognizing its actuation signal, the computer logic 30, which can be integral with or connected to the facsimile machine 18, completes a telephone communication with the local node 8 over the shared direct line 28 having the associated private telephone exchange 26. Once connected, the data which was received from the facsimile machine 16 by the local node can be transmitted to facsimile machine 18. In some cases, the actuation will occur almost simultaneously whereby the facsimile machine 16 will directly connect with facsimile machine 18, although the signal is being processed through the local node 8. Thus, the facsimile machine 18 has a unique and conventional telephone number address without a dedicated telephone line, however, the telephone number address of facsimile machine 18, when used, results in a telephone communication being established between the originating data transmitting/receiving device and the local node 8. The local node 8 then routes the data appropriately to the facsimile machine 18.

A further advantage of this arrangement is that simultaneous transmissions for the destined transmitting/receiving device can be received by the process intermediary for eventual transmission to the destined transmitting/receiving device and similarly, transmissions can be received by the process intermediary for the destined transmitting/receiving device when it is transmitting data. Therefore, this arrangement increases the momentary capacity of the receiving device while reducing the requirements thereof, thereby ensuring that originating transmitting/receiving devices do not experience busy signals when the destined transmitting/receiving device is in use as long as the capacity of the process intermediary has not been exceeded.

In the case of long distance communications, the signal would be processed within the digital data network from one local node 8 to a local node in close proximity to the destined transmitting/receiving device. Thus, long distance data transmissions are transmitted over the more efficient digital data network. Non-long distance communications are generally routed through the public switched telephone network. It is more appropriate to use the public switched network for local calls as there is no additional cost and the quality of the connection between one data transmitting/receiving device and the other is relatively high. In the case of long distance telephone communications, the channel quality is often suspect, particularly for data transmissions, and therefore it is more appropriate to use the efficient digital data network which is specifically designed for the transmission of data whereby higher quality and lower costs can be realized.

With the present invention, it is possible to allow people to select a different form of data transmission or facsimile service which involves the process intermediary while the general public cannot distinguish between this facsimile service and that of a dedicated line. This is obviously preferred as the originator will not experience any difficulty in completing the transmission as it is initiated in an identical manner to standard data or facsimile transmissions. The local area node can have a very sophisticated capability for receiving diverse data transmission signals and can also have the capability for translating these signals into an appropriate format which can be received by the data transmitting/receiving device for which the information is destined. For example, the data could originate in a personal computer and be transmitted to the local node which would recognize that particular format and translate it into an appropriate format for the destined data transmitting/receiving terminal 18. It would also be useful for the process intermediary to be able to modify one data transmission, for example a data transmission developed on an IBM™ personal computer into an appropriate format for the Apple™ personal computer, or between different word processors, or between computers and facsimile machines, or other combinations requiring conversion or processing. In this way, users who recognize that they have incompatible data transmitting/receiving devices could route the data transmission through the process intermediary which would effectively translate the data transmission into an appropriate format and transmit it to the destined transmitting/receiving device. The process intermediary obviously could have very sophisticated hardware and software to carry this out, while the cost for this service could be relatively inexpensive due to the sharing of this capability over a large number of users.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A data transmission system having a host of data transmitting and receiving devices and a process intermediary unit for sending data at least partially by a telephone system between an originating data transmitting/receiving device and a destined data transmitting/receiving device via the process intermediary unit; at least some of said data transmitting/receiving devices including means for receiving a non-telephone actuation signal and means for initiating a telephone communication with the process intermediary unit upon receipt of the actuation signal; and wherein said process intermediary unit includes (a) means for receiving communications destined for one of said data transmitting/receiving devices identified by a telephone number or telephone number address, and (b) means for producing and transmitting an appropriate non-telephone actuation signal when a communication is received and the identified data transmitting/receiving device is one of said data transmitting/receiving devices capable of being actuated by said non-telephone actuation signal;

said process intermediary unit including a plurality of allocated telephone number addresses which are individually assigned to data transmitting/receiving devices to be used for receiving data and wherein each of the individual data transmitting/receiving devices having an assigned telephone number address is capable of being actuated by means of the non-telephone actuation signal whereby data sent to an individual data transmitting/receiving device via the assigned telephone number address is received by the process intermediary unit and subsequently delivered by the process intermediary unit to the particular data transmitting/receiving device to which the telephone number address has been assigned, the process intermediary unit delivering the data by actuating the individual data transmitting/receiving device via the non-telephone actuation signal and the actuated data transmitting/receiving device initiating a telephone communication with said process intermediary unit through which the dats is delivered to the transmitting/receiving device.

2. A data transmission system as claimed in claim 1, wherein said process intermediary unit includes information associated with each data transmitting/receiving device having an assigned telephone number address whereby data destined for a particular data transmitting/receiving device in a format which cannot be received by said particular data transmitting/receiving device is appropriately translated by the process intermediary unit and transmitted to said particular data transmitting/receiving device in an appropriate format.

3. A data transmission system as claimed in claim 1, wherein the data transmitting/receiving devices having assigned telephone number addresses are facsimile machines.

4. A data transmission system as claimed in claim 3, wherein the process intermediary unit can receive and store both the telephone number address and the data to be received by the destined facsimile machine.

5. In long distance transmission of data between transmitting/receiving devices via a process intermediary unit wherein the transmission of data uses an existing public switched telephone network for transmitting data from an originating transmitting/receiving device to the process intermediary unit and from the process intermediary unit to a destined transmitting/receiving device, the improvement comprising said process intermediary unit including a number of local nodes which are interconnected by a digital data transmission network by means of which data, to be transmitted a long distance, received by the process intermediary unit at a local node, is transmitted to another appropriate local node, and wherein at least some of said data transmitting/receiving devices associated with the process intermediary unit each have a unique telephone number address which when used results in a telephone connection with said process intermediary unit with said telephone number address being recorded and used by the process intermediary unit to identify the receiving device for which the data is destined.

6. A plurality of data transmitting/receiving terminals, each terminal having a non-telephone actuation means which when actuated causes said data transmitting/receiving terminal to complete a telephone connection with a process intermediary unit by means of existing telephone networks, said process intermediary unit having a host of telephone number addresses which are assigned to uniquely identify each of said data transmitting/receiving terminals and when any of the telephone number addresses are used a telephone connection is made with the process intermediary unit, wherein said process intermediary unit upon receipt of a communication for a particular telephone number address transmits a non-telephone actuation signal which is received by a destined transmitting/receiving terminal identified by the telephone number address which actuates said destined transmitting/receiving terminal to effect a telephone connection with the process intermediary unit and by means of which data destined for the receiving terminal is transmitted thereto by the process intermediary unit.

* * * * *